United States Patent
Li et al.

(10) Patent No.: US 8,683,209 B2
(45) Date of Patent: Mar. 25, 2014

(54) METHOD AND APPARATUS FOR PSEUDONYM GENERATION AND AUTHENTICATION

(75) Inventors: Hui Li, Shanghai (CN); Jin Qu, Shanghai (CN)

(73) Assignee: Koninklijke Philips N.V., Eindhoven (NL)

( * ) Notice: Subject to any disclaimer, the term of this patent is extended or adjusted under 35 U.S.C. 154(b) by 337 days.

(21) Appl. No.: 13/123,918

(22) PCT Filed: Oct. 13, 2009

(86) PCT No.: PCT/IB2009/054498
§ 371 (c)(1),
(2), (4) Date: Apr. 13, 2011

(87) PCT Pub. No.: WO2010/044056
PCT Pub. Date: Apr. 22, 2010

(65) Prior Publication Data
US 2011/0202767 A1    Aug. 18, 2011

(30) Foreign Application Priority Data
Oct. 14, 2008    (CN) .......................... 2008 1 0169374

(51) Int. Cl.
*G06F 21/00* (2013.01)
*H04L 9/32* (2006.01)

(52) U.S. Cl.
USPC ................. 713/182; 713/168; 726/7; 726/26

(58) Field of Classification Search
None
See application file for complete search history.

(56) References Cited

U.S. PATENT DOCUMENTS

| | | | | |
|---|---|---|---|---|
| 6,886,096 | B2* | 4/2005 | Appenzeller et al. | 713/170 |
| 7,587,368 | B2* | 9/2009 | Felsher | 705/65 |
| 8,495,372 | B2* | 7/2013 | Bailey et al. | 713/171 |
| 2002/0174073 | A1* | 11/2002 | Nordman et al. | 705/64 |
| 2003/0081785 | A1* | 5/2003 | Boneh et al. | 380/277 |
| 2005/0193198 | A1* | 9/2005 | Livowsky | 713/168 |
| 2008/0157927 | A1* | 7/2008 | Soppera et al. | 340/10.1 |

FOREIGN PATENT DOCUMENTS

WO    03017559    2/2003

OTHER PUBLICATIONS

Lysyanskaya, "Pseudonym Systems," MIT Laboratory for Computer Science, Mar. 3, 1999, pp. 1-15.*
Lysyanskaya, "Pseudonym Systems", MIT, A.B., Computer Science and Mathematics, Department of Electrical Engineering and Computer Science, Jun. 1999, pp. 1-52.*
Reischl et al: "Pharmacogenetic Research and Data Protection-Challenges and Solutions"; The Pharmaceutical Journal, 2006, vol. 6, pp. 225-233.

(Continued)

*Primary Examiner* — Jung Kim
*Assistant Examiner* — James J Wilcox

(57) ABSTRACT

The invention provides a method and apparatus for pseudonym generation and authentication. The method comprises the steps of: transmitting a user identity $ID_{user}$ to a Personal Identity Manager (PIM); receiving a set of public parameters and a prime pseudonym $P_{prime}$ corresponding to the ID user from the PIM; and selecting at least two random parameters, and generating a sub-pseudonym $P_{pseu}$ with the at least two random numbers, the set of public parameters, and the prime pseudonym $P_{prime}$.

18 Claims, 7 Drawing Sheets

(56) References Cited

OTHER PUBLICATIONS

Claerhout et al: "Privacy Protection for Clinical and Genomic Data: The Use of Privacy-Enhancing Techniques in Medicine"; International Journal of Medical Informatics, 2005, Vo. 74, pp. 257-265.

Riedl et al: "A Secure Architecture for the Pseudonymization of Medical Data"; Second International Conference on Availability, Reliability and Security (ARES'07), IEEE 2007, 7 Page Document.

Huang, D.:Pseudonym-Based Cryptopgraphy for Anonymous Communications in Mobile Ad Hoc Networks'; International Journal of Security and Networks; vol. 2, No. 3-4, 2007, pp. 272-283.

Chen et al: "Applications of Multiple Trust Authorities in Pairing Based Cryptosystems"; Lecture Notes in Computer Science, vol. 2437, Jan. 2002, pp. 260-275.

Menezes et al: "Handbook of Applied Cryptology"; Chapter 10: "Identification and Entity Authentication"; pp. 385-424, 1997.

* cited by examiner

METHOD AND APPARATUS FOR PSEUDONYM GENERATION AND AUTHENTICATION

FIELD OF THE INVENTION

The invention generally relates to a method and apparatus for protecting user privacy, and more particularly to a method and apparatus for protecting user privacy with a pseudonym.

BACKGROUND OF THE INVENTION

With the development of electronic technologies, electronic medical systems have been widely employed in modern medical organizations so as to maintain and manage the individual information and health records (such as the case history, the testing report, and the like) of users (for example, patients). However, electronic records are vulnerable to theft and dissemination. Accordingly, the security issue of modern electronic medical systems is a matter of great concern.

To improve the security of electronic medical systems, two methods of protecting user privacy have been proposed: anonymization and pseudonymization. The purpose of anonymization is to remove the association between the real identity of a user and his or her health records. In other words, in an anonymization method, no individual information about the user is recorded, and only the health records are kept. In such an anonymization method, the user cannot be traced via the health records, though user privacy may be protected securely. The pseudonymization method has been developed on the basis of the anonymization method. In the pseudonymization method, the association between the real identity of a user and his health records has been removed, and the relationship of correspondence is established between the user's health records and one or more of his pseudonyms. Accordingly, the pseudonymization method provides protection of the user's individual information, as well as traceability of his health records.

FIG. 1 illustrates a current pseudonymization mechanism developed by the Healthcare Information Technology Standards Panel (HITSP). As shown in FIG. 1, when a user U100 goes to hospital, he first provides a user identity $ID_{user}$ identifying his real identity to a medical system D110 of the hospital in step S110. In step S120, the medical system D110 sends the $ID_{user}$ to a Person Identifier Cross-Reference (PIX) manager D120. In step S130, the PIX manager D120 stores the $ID_{user}$ and requests a pseudonym server D140 for pseudonym generation so as to assign a pseudonym to the user in step S140. In step S150, the pseudonym server D140 generates a pseudonym $P_{pseu}$ for the user in response to the request, and in step S160, the pseudonym server D140 returns the generated pseudonym $P_{pseu}$ to the PIX manager D120. In step S170, the PIX manager D120 stores the received pseudonym $P_{pseu}$ in a one-to-one association with the $ID_{user}$ and, in step S180, returns a pseudonym certificate containing the pseudonym $P_{pseu}$ to the medical system D110. Then, the medical system D110 of the hospital registers the pseudonym certificate in step S190, and returns it to the user U100 in step S195. In this way, the user U100 may be diagnosed or treated with the assigned pseudonym in the hospital, and his health records will be recorded in the name of the pseudonym. Alternatively, the hospital may obtain the real identity of the user from the PIX manager D120 by using this pseudonym certificate as desired, so that traceability may be achieved.

Unfortunately, the current pseudonymization method as shown in FIG. 1 has some drawbacks.

First, in consideration of security, privacy or the like, or for the reason that a user may have lost a previously generated pseudonym, he may request generation of a new pseudonym every time he goes to the hospital, or even request generation of multiple different new pseudonyms so that diagnosis and/or treatment may be performed for various diseases in the same hospital. In this case, the pseudonym server D140 in FIG. 1 has to generate pseudonyms for the user frequently, which leads to a heavy workload on the pseudonym server. Meanwhile, the PIX manager has to save the relationships of correspondence between the real identity of a user and a large number of pseudonyms. Therefore, the PIM has to be provided with a mass storage database, which leads to an increase in cost of the server.

Secondly, the provision of pseudonymization services is generally distinctly regional, that is, a local pseudonym server and an identity manager can only provide pseudonymization services to medical systems in local hospitals within their service coverage or medical systems employing the same pseudonymization service mechanism. In other words, if a medical system generates a pseudonym for a user, medical systems in different regions or with different pseudonymization mechanisms cannot identify the pseudonym for the same user. Every time the user moves from one region to another new region, he must therefore disclose his real identity to the PIM in this new region before obtaining a pseudonym valid in this new region, and then he uses this pseudonym to be treated at the hospital. This causes much inconvenience to the users.

Thirdly, in some trust-based cases, a user is only willing to disclose his real identity to his own trusted local PIM, rather than to a PIM in another strange region. In this respect, the current pseudonymization method can only be applied in a very limited region.

There is, therefore, a need to provide an improved method and apparatus for pseudonym generation and authentication so as to assist the user in enjoying a cross-regional medical service easily and securely.

OBJECT AND SUMMARY OF THE INVENTION

It is an object of the invention to provide a method and apparatus for pseudonym generation and authentication with which cross-regional identity identification can be provided.

It is another object of the invention to provide a method and apparatus for pseudonym generation and authentication with which the workload of the server can be alleviated.

To achieve the above objects, the invention provides a method for pseudonym generation in a Personal Identity Manager (PIM). The method comprises the steps of: determining a set of public parameters and a set of private parameters; receiving a user identity $ID_{user}$ from a user device; generating a prime pseudonym $P_{prime} = <H_1(ID_{user}), H_1^{\partial}(ID_{user})>$ based on the determined set of private parameters and the $ID_{user}$, in which $H_1$ is a one-way hash function, $\partial$ is a random number selected from a domain $Z_p$, and p is a selected prime number; and transmitting the prime pseudonym $P_{prime}$ and the set of public parameters to the user device.

With this method, a user is only provided with a prime pseudonym once when he makes an initial registration with the PIM. There is no need to generate multiple pseudonyms for the same user frequently. In this manner, the workload of the PIM may be alleviated with this method.

To achieve the above objects, the invention provides a method for pseudonym generation in a user device. The method comprises the steps of: transmitting a user identity $ID_{user}$ to a Personal Identity Manager (PIM); receiving a set of public parameters and a prime pseudonym $P_{prime}$ corresponding to the $ID_{user}$ from the PIM; and selecting at least two random parameters, and generating a sub-pseudonym $P_{pseu}$ with the at least two random parameters, the set of public parameters, and the prime pseudonym $P_{prime}$.

With this method, the user device may self-generate a sub-pseudonym based on a prime pseudonym obtained from the PIM. Moreover, since the sub-pseudonym is generated by using at least two random parameters, the generated sub-pseudonym masks information about the prime pseudonym very well, and there is no association among multiple sub-pseudonyms being generated. Even if one or more sub-pseudonyms are wiretapped in this case, the wiretapper cannot derive the prime pseudonym of the user inversely with the wiretapped sub-pseudonyms. In this manner, the pseudonym generation mechanism has a high level of security.

To achieve the above objects, the invention provides a method for pseudonym authentication in a third-party device. The method comprises the steps of: receiving a sub-pseudonym $P_{pseu}$ and an identifier $ID_{server}$ for identifying a Personal Identity Manager (PIM) from a user device; obtaining a set of public parameters from the PIM based on the identifier $ID_{server}$; and authenticating the validation of the sub-pseudonym $P_{pseu}$ by interacting with the user device on the basis of the set of public parameters.

With this method, any third-party device dependent on or independent of the PIM may authenticate the validation of the sub-pseudonym provided from the user device by interacting with the user device on the basis of the set of public parameters obtained from the PIM. In this manner, the use of the sub-pseudonym is not region-limited anymore. With the above method, a medical system in a hospital within any region may identify the user's sub-pseudonym and may then trace his real identity by using the corresponding PIM which assigns the prime pseudonym to the user.

According to another aspect of the invention, a Personal Identity Manager (PIM) is provided, the PIM comprising: a determining unit configured to determine a set of public parameters and a set of private parameters; a receiving unit configured to receive a user identity $ID_{user}$; a generating unit configured to generate a prime pseudonym $P_{prime}=<H_1(ID_{user}),H_1^{\partial}(ID_{user})>$ based on the set of private parameters and the $ID_{user}$, in which $H_1$ is a one-way hash function, $\partial$ is a random number selected from a domain $Z_p$, and p is a selected prime number; and a transmitting unit configured to transmit the prime pseudonym $P_{prime}$ to the user device.

According to another aspect of the invention, a user device is provided, the user device comprising: a transmitting unit configured to transmit a user identity $ID_{user}$ to a Personal Identity Manager (PIM); a receiving unit configured to receive a set of public parameters and a prime pseudonym $P_{prime}$ corresponding to the $ID_{user}$ from the PIM; and a generating unit configured to select at least two random parameters and generate a sub-pseudonym $P_{pseu}$ with the at least two random parameters, the public parameters, and the prime pseudonym $P_{prime}$.

According to another aspect of the invention, a third-party device is provided, from which a user may request a service, the third-party device comprising: a receiving unit configured to receive a sub-pseudonym $P_{pseu}$ and an identifier $ID_{server}$ for identifying a Personal Identity Manager (PIM) from a user device; a transmitting unit configured to transmit information to the user device; an acquisition unit configured to acquire a set of public parameters from the PIM based on the identifier $ID_{server}$; and an authenticating unit configured to authenticate the validation of the sub-pseudonym $P_{pseu}$ by interacting with the user device via the transmitting unit and the receiving unit on the basis of the set of public parameters.

Other objects and accomplishments together with a more thorough understanding of the invention are apparent from and will be elucidated with reference to the following description and claims taken in conjunction with the accompanying drawings.

BRIEF DESCRIPTION OF THE DRAWINGS

The disclosure will be described hereinafter in further detail, by way of example, with reference to the accompanying drawings, in which.

Throughout the drawings, identical reference numerals are understood to refer to similar or corresponding features or functions.

DESCRIPTION OF EMBODIMENTS

A medical system will be taken as an example so as to describe the method and apparatus for pseudonym generation and authentication according to an embodiment of the invention. However, those skilled in the art will appreciate that the method and apparatus for pseudonym generation and authentication according to the invention is not limited to applications in the hospital, but may equally be applied to other fields where the real identity of a user is to be protected. For example, the method and apparatus for pseudonym generation and authentication may equally be applicable to the fields of cyber shopping, book management, etc.

Figure 1:
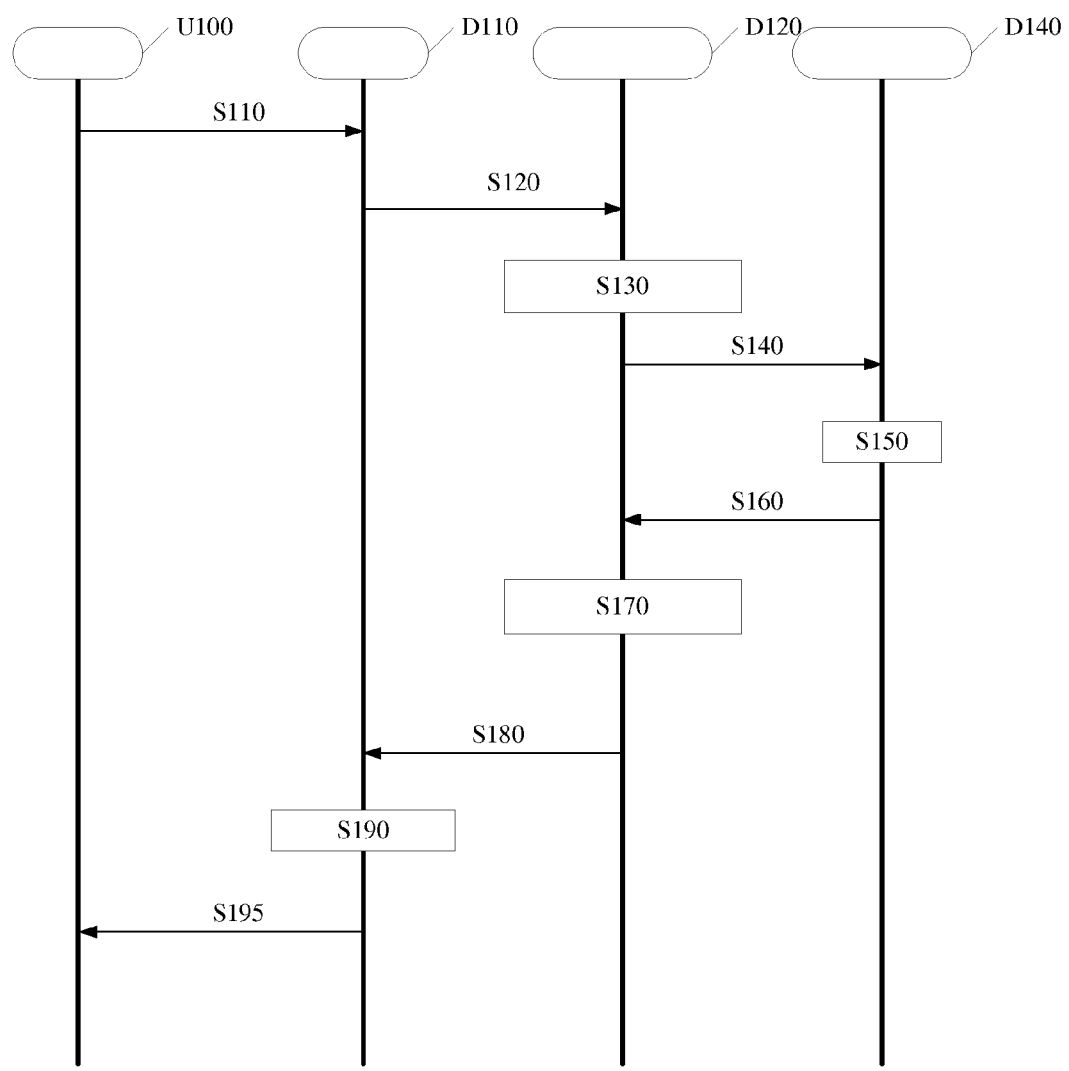
FIG. 1 illustrates an example of a flow chart of a current pseudonymization method.
Figure 2:
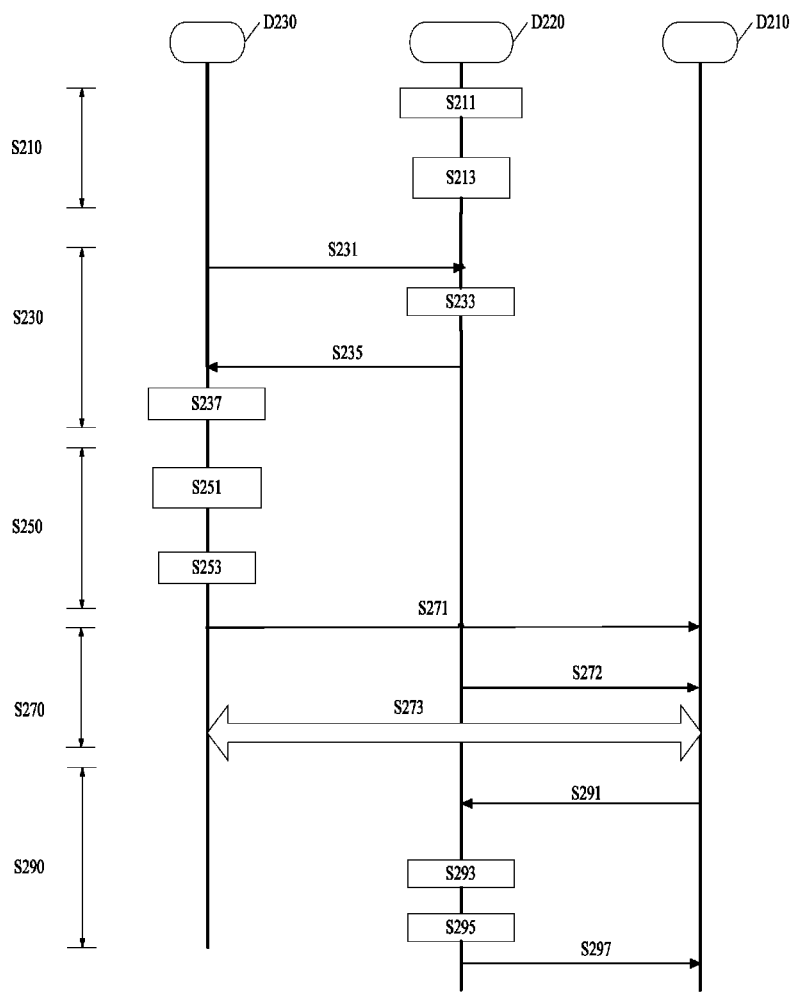
FIG. 2 illustrates a flow chart of a method for pseudonym generation and authentication according to an embodiment of the invention.

FIG. 2 illustrates a method for pseudonym generation and authentication according to an embodiment of the invention. In contrast to FIG. 1, the method shown in FIG. 2 involves three entities: a medical system D210 for use in a hospital, a Personal Identity Manager (PIM) D220, and a user device D230.

In FIG. 2, the medical system D210 is a management system equipped in a hospital, configured to manage and store the health records or the like of its users. The PIM D220 is a server configured to manage and store the real identity of a user. In the embodiment shown in FIG. 2, the PIM D220 is incorporated with a pseudonym allocation function and may generate a unique prime pseudonym $P_{prime}$ for a registered user. In the invention, however, the prime pseudonym is not limited to uses in the hospital. Alternatively, the pseudonym allocation function may be implemented in a device independent of the PIM D220. For example, in the HITSP system shown in FIG. 1, the PIX manager may store and manage the real identity of a user, whereas the pseudonym server may implement the prime pseudonym allocation function. For the HITSP system, the PIM D220 in FIG. 2 may thus correspond to a combination of the PIX manager and the pseudonym server.

The user device D230 in FIG. 2 may be any device with a processing capability, such as a mobile phone, a PDA, a notebook, a smart card, or the like, configured to further generate one or more sub-pseudonyms $P_{pseu}$ automatically based on the prime pseudonym $P_{prime}$ generated by the PIM D220. The sub-pseudonyms $P_{pseu}$ will be registered in the medical system D210 when the user goes to the hospital. The sub-pseudonym generation function of the user device D230, for example, may be implemented in the application software loaded in the user device 20, or in a functional hardware module capable of being connected to the user device.

Referring to FIG. 2, the operations of a method for pseudonym generation and authentication are described in detail according to an embodiment of the invention. In the embodiment shown in FIG. 2, the method for pseudonym generation and authentication according to the invention may be divided into five phases: a setup phase (S210), a prime pseudonym registration phase (S230), a sub-pseudonym generation phase (S250), a sub-pseudonym authentication phase (S270), and a user identity tracing phase (S290). However, those skilled in the art will appreciate that the invention is not limited to this embodiment. Rather, some steps (for example, the user identity tracing phase) in the embodiment may be omitted as required, or some steps may intercross with each other. The specific operations of the five phases will be described with reference to FIG. 2.

Setup

The method for pseudonym generation and authentication as shown in FIG. 2 is proposed on the basis of an identity-based encryption (IBE) method. In the initial setup phase S210, the PIM D220 determines a set of public parameters and a set of private parameters used for pseudonym generation and authentication based on the IBE method.

In step S211, the PIM D220 selects basic parameters. Specifically, the PIM D220 first selects two prime numbers p and q, and selects a random number a $\partial \in Z_p$ from a domain of an integer mod p (i.e. a domain $Z_p$). Then, the PIM D220 selects two groups of order q modulo p, $G_1$ and $G_2$, in other words, each selected group $G_1$ and $G_2$ has q finite elements, and the group $G_1$ or $G_2$ is a subset of the domain $Z_p$. The PIM D220 also selects a bilinear map $\hat{e}: G_1 \times G_1 \rightarrow G_2$ to be used between $G_1$ and $G_2$. Here, a bilinear map $\hat{e}: G_1 \times G_1 \rightarrow G_2$ refers thereto: for all P,Q$\in G_1$, $\hat{e}(P, Q)$ is an element in the group $G_2$, i.e., $\hat{e}(P, Q) \in G_2$; and for any a, b$\in Z_p$, $\hat{e}(aP, bQ) = \hat{e}(P, Q)^{ab}$. The PIM D220 then selects a random generator g$\in G_1$ from the group $G_1$, and selects two one-way hash functions $H_1$ and $H_2$. The two hash functions may satisfy the conditions $H_1: \{0,1\}^* \rightarrow G_1$ and $H_2: G_2 \rightarrow \{0,1\}^*$. In other words, $H_1$ is a first one-way hash function which maps a sequence of 0 and 1 having an arbitrary length (for example, representing a character string) to an element in the group $G_1$, and $H_2$ is a second one-way hash function which maps an element in the group $G_2$ to a sequence of 0 and 1 having an arbitrary length.

After selecting the above basic parameters, in step S213, the PIM D220 selects $\{g, g^\partial, G_1, G_2, \hat{e}, H_2, p\}$ from the above parameters to form a set of public parameters, and selects $\partial$ and $H_1$ as a set of private parameters. Here, the set of public parameters $\{g, g^\partial, G_1, G_2, \hat{e}, H_2 p\}$ is published, and any of other devices may obtain the set of public parameters from the PIM D220. Meanwhile, the set of private parameters $\{\partial, H_1\}$ is secured privately so that a prime pseudonym $P_{prime}$ may be securely generated for the user when a registration is made by the user.

Registration

Before the user goes to the hospital for the first time, he may choose to register with a trustworthy local PIM D220 in the registration phase S230 so as to obtain a prime pseudonym.

Specifically, in step S231, the user may send a user identity $ID_{user}$ identifying his real identity to the PIM D220 in a registration request by using the user device D230 (such as a PDA) that he carries. In step S233, the PIM D220 stores the received $ID_{user}$ in a user identity database, and generates a prime pseudonym $P_{prime} = <H_1(ID_{user}), H_1^\partial(ID_{user})>$ with the received $ID_{user}$ and the previously determined set of private parameters $\{\partial, H_1\}$. The prime pseudonym is a binary group in which one term is a first hash value calculated by applying the private first one-way hash function $H_1$ to $ID_{user}$, and the other term is the first hash value to the power of $\partial$. Then, in step S235, the PIM D220 sends the generated prime pseudonym $P_{prime}$ along with the set of public parameters to the user device D230 as a response indicating successful registration. In step S237, the user device D230 stores the received prime pseudonym $P_{prime}$ and the set of public parameters so that a corresponding sub-pseudonym may be generated in the future as desired. Then, the registration process ends.

Sub-pseudonym Generation

To prevent the PIM D220 from generating pseudonyms for the user frequently in the embodiment shown in FIG. 2, the prime pseudonym $P_{prime}$ generated by the PIM D220 is in fact not used in the hospital. In contrast, in phase S250, every time the user goes to the hospital, the user device D230 will self-generate at least one sub-pseudonym based on the prime pseudonym $P_{prime}$ obtained from the PIM D220.

Specifically, in step S251, the user device D230 selects, for example, two random numbers $k_1, k_2 \in Z_p$ from the domain $Z_p$ based on the stored set of public parameters. Then, in step S253, the user device D230 generates a sub-pseudonym with the two selected random numbers, the set of public parameters and the prime pseudonym $P_{prime}$. In this step, the user device D230 may first calculate the following parameters:

$$Q_A = H_1^{k_1^2 k_2}(ID);$$

$$Q_B = g^{k_1^2};$$

$$c_A = \hat{e}(Q_C, Q_D),$$

in which $Q_C = g^{k_1 k_2}$, $$Q_D = H_1^{\partial k_1(k_2^{-1}-1)}(ID),$$

in which $k_2^{-1}$ is the inverse of the random number $k_2$, that is, $k_2 k_2^{-1}$ mod p=1.

Then, the user device D230 generates a sub-pseudonym $P_{pseu} = <Q_A, Q_B, c_A>$ containing three terms based on the above calculated parameters.

With the above steps S251~S253, the user device D230 may self-generate different sub-pseudonyms by selecting different random numbers $k_1, k_2 \in Z_p$. Here, information about the prime pseudonym is securely hidden in the sub-pseudonym because random numbers $k_1, k_2 \in Z_p$ are used for sub-pseudonym generation. It would be difficult for others to calculate information about the prime pseudonym through an inverse calculation based on the stolen sub-pseudonym. Moreover, since $k_1$ and $k_2$ are selected randomly, there will be no associated characteristics among several sub-pseudonyms generated by the same user device D230. In this manner, even if sub-pseudonyms generated by the user device D230 are stolen by others, it is impossible to derive the prime pseudonym assigned by the PIM to the user device based on these sub-pseudonyms. The user may thus safely use the sub-pseudonym generated for him.

Furthermore, while two random numbers are used for sub-pseudonym generation in this embodiment, those skilled in the art will appreciate that it is possible to generate a sub-pseudonym with more than two random parameters in a well-calculated design. Therefore, the invention is not limited to two random numbers as indicated in this embodiment.

Sub-pseudonym Authentication

Every time the user goes to the hospital, he will use the generated sub-pseudonym so as to register in the medical system of the hospital. In phase S270, the medical system D210 of the hospital will first authenticate the validation of the sub-pseudonym provided by the user device D230, that is, authenticate whether the sub-pseudonym is generated on the basis of the prime pseudonym assigned to the user by the PIM so as to ensure that the user's real identity may be traced from the corresponding PIM.

As shown in FIG. 2, the authentication process starts from step S271. In step 271, the user device D230 sends the medical system D210 a self-generated sub-pseudonym $P_{pseu}=<Q_A, Q_B, c_A>$, as well as an identifier $ID_{server}$ of the local PIM D220 (for example, the name or address of the PIM D220). In step S272, the medical system D210 obtains a set of public parameters $\{g, g^{\partial}, G_1, G_2, ê, H_2, p\}$ from the corresponding PIM D220 based on the received $ID_{server}$. After the set of public parameters has been obtained, the medical system D210 may authenticate the validation of the sub-pseudonym provided by the user device D230 by interacting with the user device in step S273.

Figure 3:
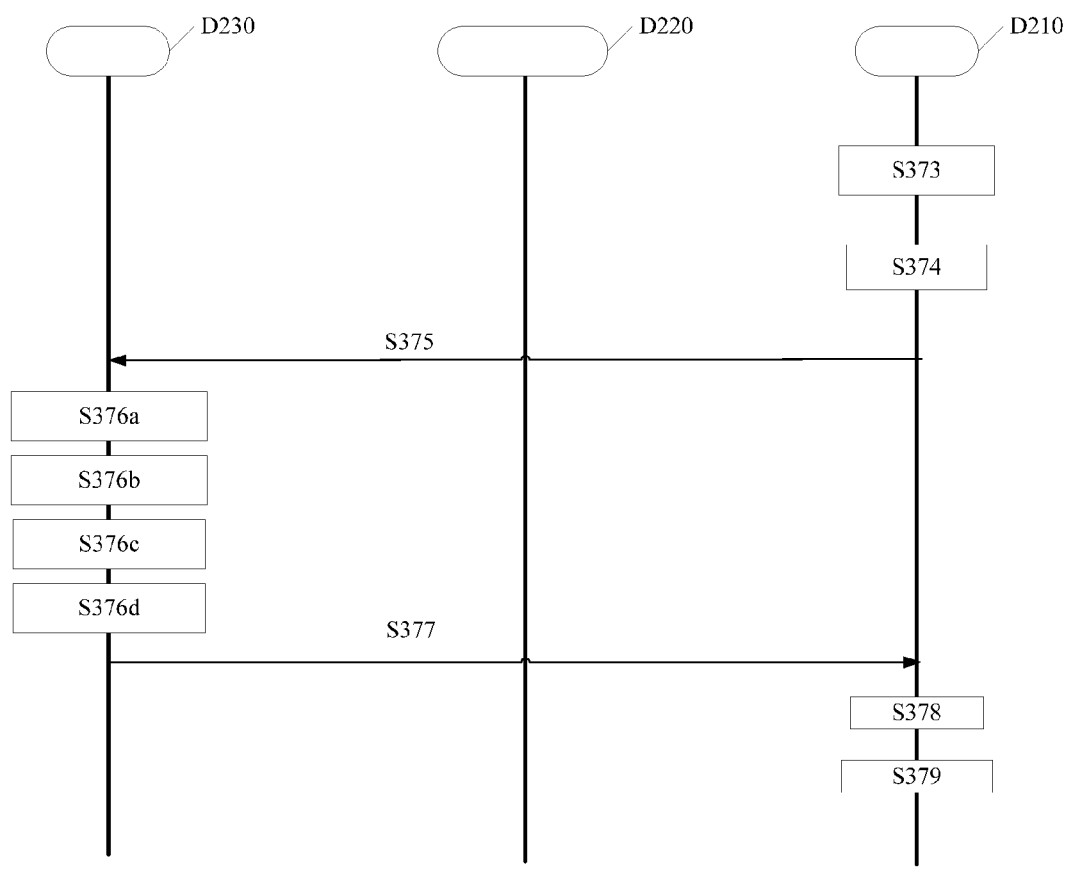
FIG. 3 illustrates a flow chart of a method for sub-pseudonym authentication according to an embodiment of the invention.

The authentication process in step 273 may be implemented in various manners. For example, when the user trusts the medical system D210 (for example, a local medical system) completely, the medical system D210 may take a prime pseudonym from the user device D230. After a prime pseudonym has been obtained from the user device D230, the medical system D210 may authenticate that the sub-pseudonym is generated in accordance with the prime pseudonym and that the prime pseudonym is assigned by the PIM D220 identified by $ID_{server}$, based on the prime pseudonym and the sub-pseudonym provided by the user. More preferably, in step S273, the medical system D210 may authenticate the sub-pseudonym by exchanging zero-knowledge proofs with the user device D230. Since it is not necessary for the user device D230 to reveal information about its prime pseudonym to the medical system D210 in the zero-knowledge proof exchange process, the method is more secure. Exchange of zero-knowledge proofs may also be implemented in various manners. FIG. 3 illustrates only one of the implementations.

As shown in FIG. 3, in step S373, the medical system D210 selects a random number t from the domain $Z_p$ based on a parameter p in the set of public parameters, that is, $t \in Z_p$. Meanwhile, the medical system D210 may select an original session key $K_{ses}$ and a query content $N_a$ randomly. The query content $N_a$ may be a random number, or an arbitrary string represented by a sequence of 0 and 1. After the parameters have been selected, the medical system D210 may generate a query message containing three terms based on the selected parameters t, $K_{ses}$ and $N_a$, g and $H_2$ in the set of public parameters, and the received sub-pseudonym $P_{pseu}=<Q_A, Q_B, c_A>$ in step S374:

$$\text{Challenge}=<g^t, K_{ses} \oplus H_2(O_B{}^t c_A{}^t), \text{Enc}(K_{ses}, N_a)>,$$

in which $O_B = ê(g^{\partial}, Q_A)$.

In this query message, the first term $g^t$ carries information about the random number t, the second term $K_{ses} \oplus H_2(O_B{}^t c_A{}^t)$ is equivalent to an encrypted session key, and the third term $\text{Enc}(K_{ses}, N_a)$ represents an encrypted content obtained by encrypting the query content $N_a$ with the original session key $K_{ses}$. Then, in step S375, the medical system D210 sends the query message to the user device D230 and waits for a reply from the user device D230.

In step S376a, upon receipt of the query message, the user device D230 calculates a session key $K^*_{ses}$ from the query message with the following equation:

$$K^*_{ses}=K_{ses} \oplus H_2(O_B{}^t c_A{}^t) \oplus H_2(ê(g^t,(H_1{}^{\partial}(ID_{user}))^{k_1{}^2 t})),$$

in which $\oplus$ represents an XOR operation.

It can be seen from the above equation that the term $K_{ses} \oplus H_2(O_B{}^t c_A{}^t)$ on the right of the equation is an encrypted session key included in the query message, and the term $H_2(ê(g^t,(H_1{}^{\partial}(ID_{user}))^{k_1{}^2 t}))$ on the right of the equation is a reference term generated by the user device D230 on the basis of the prime pseudonym, the set of public parameters and the query message. If the user device D230 does store the prime pseudonym $P_{prime}$ assigned by the PIM D220, that is, $H_1{}^{\partial}(ID_{user})$ is stored, then the bilinear map ê in the set of public parameters is such that the result of $H_2(O_B{}^t c_A{}^t) \oplus H_2(ê(g^t,(H_1{}^{\partial}(ID_{user}))^{k_1{}^2 t}))$ in the above equation is exactly 0. Then, the encrypted term $H_2(O_B{}^t c_A{}^t)$ of the session key may be eliminated so as to obtain an original session key $K_{ses}$, i.e., $K^*_{ses}=K_{ses}$. Subsequently, in step S376b, the encrypted content $\text{Enc}(K_{ses}, N_a)$ is decrypted with the calculated session key $K^*_{ses}$ so as to obtain the decrypted content Na*. If the session key $K^*_{ses}=K_{ses}$ is obtained correctly in step S376a, the decrypted content may be decrypted correctly in step S376b as Na*=Na. Afterwards, in step S376c, the user device D230 selects a response content $N_b$ corresponding to the decrypted content Na* in accordance with a predetermined rule negotiated in advance with the medical system D210 of the hospital. In this embodiment, the predetermined rule may be, for example, $N_b=N_a*+1$. Of course, the predetermined rule is not limited to this case. After the response content has been selected, the user device D230 may encrypt the response content $N_b$ with the calculated $K^*_{ses}$ in step S376d so as to obtain a response message $\text{Enc}(K^*_{ses}, N_b)$. In step 377, the user device D230 sends the response message $\text{Enc}(K^*_{ses}, N_b)$ to the medical system D210 of the hospital as a response to the query message.

In step S378, upon receipt of the response message, the medical system D210 decrypts the received response message $\text{Enc}(K^*_{ses}, N_b)$ with the original key $K^*_{ses}$ so as to obtain the decrypted response content $N_b*$. In step S379, the medical system D210 determines whether the above predetermined rule is met between the decrypted response content $N_b*$ and the original content $N_a$. For example, the medical system D210 determines whether $N_b*$ is equal to Na+1 in this embodiment. As described above, if the user device D230 can calculate the original session key correctly, that is $K^*_{ses}=K_{ses}$ then the medical system D210 can decrypt $N_b*=N_b=Na+1$ correctly with the original session key $K_{ses}$. In other words, the predetermined rule is met between the decrypted response content $N_b*$ and the query content $N_a$. If it is determined in step S379 that the predetermined rule is met between the response content $N_b*$ and the query content $N_a$, it means that the sub-pseudonym of the user device D230 is valid. Equivalently, it is proved that the sub-pseudonym is generated on the basis of the prime pseudonym assigned by the PIM identified by $ID_{server}$.

With the above authentication, if the sub-pseudonym is authenticated to be valid, the user has made a successful registration in the medical system D210. Then he may go to the hospital with the sub-pseudonym, and his health records may be stored and managed in the name of the sub-pseudonym $P_{pseu}=<Q_A, Q_B, c_A>$.

In the above authentication process, the sub-pseudonym of the user device D230 to be authenticated as valid has the precondition that the user device D230 has obtained information about the prime pseudonym $P_{prime} = <H_1(ID_{user})$, $H_1^{\partial(ID_{user})}>$ assigned by the PIM D220. Since the set of private parameters $\partial$ and $H_1$ is private here, and the first hash function $H_1$ is one-way, other unauthorized users cannot calculate the prime pseudonym $P_{prime} = <H_1(ID_{user}), H_1^{\partial}(ID_{user})>$ inversely based on the sub-pseudonym and the set of public parameters with no knowledge of $\partial$ and $H_1$. Therefore, the authentication result obtained by zero-knowledge proof exchange in steps S373~S379 is both reliable and secure.

Reverting to FIG. 2, the authentication process is performed between the medical system D210 and the user device D230. The PIM D220 is not involved in the authentication and only provides a set of public parameters to the medical system D210. No matter whether the medical system D210 is within the region of the PIM, the validation of the sub-pseudonym provided by the user may thus be authenticated as long as the medical system D210 can obtain a set of public parameters published by the PIM D220 via, for example, the network. In the embodiment shown in FIG. 3, the medical system D210 of the hospital may therefore be a third-party device within any region independent of the PIM. Accordingly, a cross-regional pseudonym service may be securely provided to the user with the method for pseudonym generation and authentication as shown in FIG. 2.

Although the sub-pseudonym provided from the user device D230 is authenticated by the medical system D210 in the embodiment shown in FIG. 2, the invention is not limited to this case. Alternatively, the authentication process may be implemented by the PIM D220. In this case, the user device D230 may send the sub-pseudonym $P_{pseu} = <Q_A, Q_B, c_A>$ to the PIM D220. The PIM D220 then interacts with the user device D230 so as to authenticate the sub-pseudonym. Since the PIM D220 knows all private parameters, the user device D230 may perform authentication by providing its prime pseudonym to the PIM D220. Alternatively, authentication may be performed by exchanging zero-knowledge proofs between the PIM D220 and the user device D220.

User Identity Tracing

Referring again to FIG. 2, after the sub-pseudonym provided by the user device D230 has been authenticated to be valid, as described above, the user may enjoy various medical services in the hospital in the name of the sub-pseudonym. In some situations, however, the medical system D210 of the hospital may desire to obtain the real identity $ID_{user}$ of the user (phase S290).

When the real identity of the user is desired, the medical system D210 sends the sub-pseudonym $P_{pseu} = <Q_A, Q_B, c_A>$ provided by the user device D230 to the PIM D220 in step S291 in the embodiment shown in FIG. 2. Then, in step S293, the PIM D220 calculates a query parameter Ver=$\hat{e}(g^{\partial}, Q_A)c_A$ corresponding to the sub-pseudonym based on the received sub-pseudonym $P_{pseu} = <Q_A, Q_B, c_A>$ and $g^{\partial}$ in the set of public parameters. Subsequently, in step S295, the PIM D220 searches a database storing $ID_{user}$ with the query parameter Ver=$\hat{e}(g^{\partial}, Q_A)c_A$. For example, for each $ID_{user}$ in the database, the PIM D220 checks whether there is an $ID'_{user}$ meeting the following equation:

$$\forall ID_{user} \in DB : \hat{e}(Q_B, H^{\partial}(ID'_{user}))? = Ver.$$

If an $ID'_{user}$ is found to meet the above equation with the query parameter Ver, the resulting $ID_{user}$ is taken as the real identity of the user corresponding to the sub-pseudonym sent from the medical system D210. Finally, in step S297, the PIM D220 returns the resulting $ID'_{user}$ to the medical system D210 of the hospital. The medical system D210 may therefore contact the user in a timely manner based on the real identity of the user obtained from the PIM D220 when it is needed.

In the above tracing process, a user identity $ID_{user}$ corresponding to the sub-pseudonym may be found by traversing the user identities in the database. Even if the PIM D220 does not store a prime pseudonym corresponding to the user identity $ID_{user}$ in the embodiments of the invention, the corresponding real identity of the user may thus be found according to the sub-pseudonym from the medical system D210. This mechanism reduces the workload on the PIM D220 while decreasing its cost. Of course, the tracing method of the invention is not limited to this case, and other alternative methods may be used to find the user identity.

A method for pseudonym generation and authentication according to an embodiment of the invention has been described above in detail with reference to FIG. 2. Each step in the flow chart of FIG. 2 may be implemented in software, hardware, or in combination of both.

Figure 4:
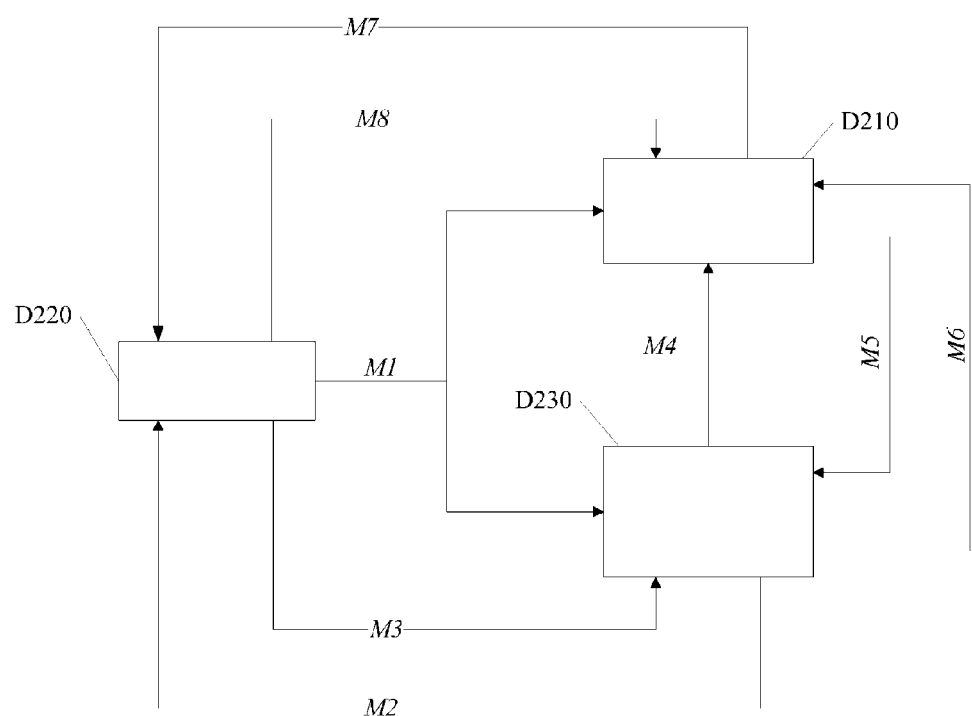
FIG. 4 illustrates the messages delivered among various entities in the method for pseudonym generation and authentication according to an embodiment of the invention.

FIG. 4 illustrates an example in which messages are delivered among three entities when the method of FIG. 2 is implemented in hardware. As shown in FIG. 4, the PIM D220 provides a set of public parameters (message M1) to the user device D230 and the medical system D210 of the hospital, and assigns a prime pseudonym $P_{prime}$ (message M3) to the user in response to a pseudonym registration request ($ID_{user}$) (message M2) from the user device D230. The user device D230 itself may generate a sub-pseudonym $P_{pseu}$ based on the assigned prime pseudonym $P_{prime}$, and sends the sub-pseudonym $P_{pseu}$ and the identifier $ID_{server}$ of the PIM D220 (message M4) as a hospital registration request to the medical system D210. Based on the received sub-pseudonym $P_{pseu}$ and the set of public parameters obtained from the PIM D220 identified by $ID_{server}$, the medical system D210 may authenticate the validation of the sub-pseudonym $P_{pseu}$ by transmitting a query message (message M5) to the user device 30 and receiving a response message (message M6) from the user device D230. The medical system D210 may also transmit a query request (message M7) containing the sub-pseudonym $P_{pseu}$ to the PIM D220 so as to obtain the real identity of the user $ID'_{user}$ corresponding to sub-pseudonym (message M8) from the PIM D220. The messages illustrated in FIG. 4 are merely examples, while the invention may have various changes and is not limited in this regard.

Figure 5:
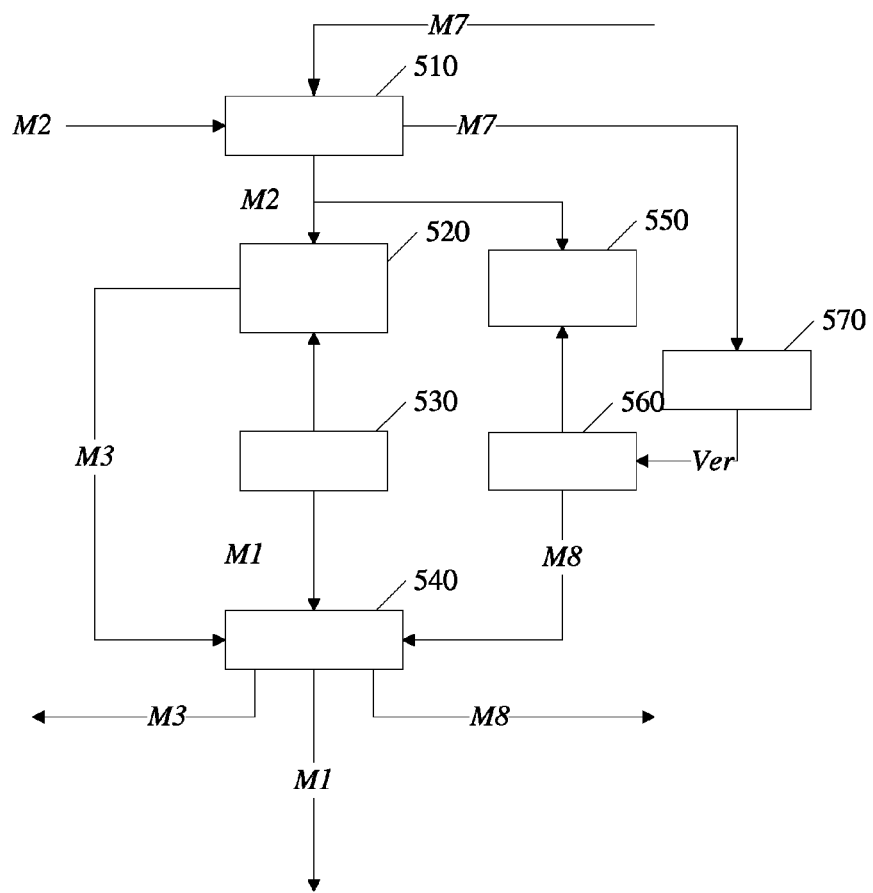
FIG. 5 illustrates the configuration of an identity manager according to an embodiment of the invention.
Figure 6:
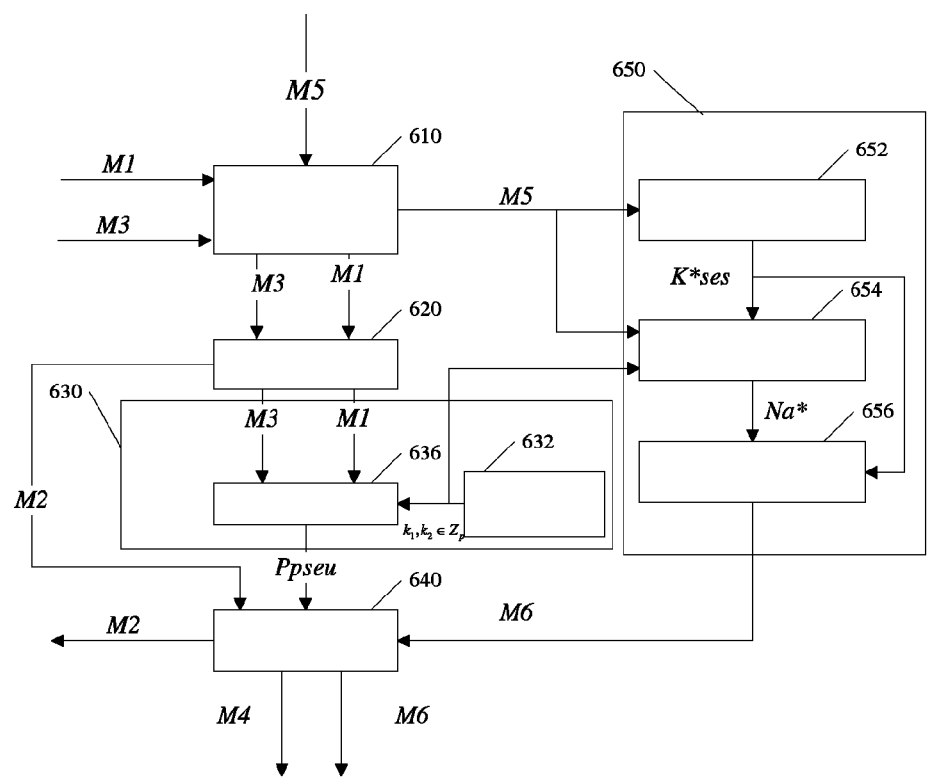
FIG. 6 illustrates the configuration of a user device according to an embodiment of the invention.
Figure 7:
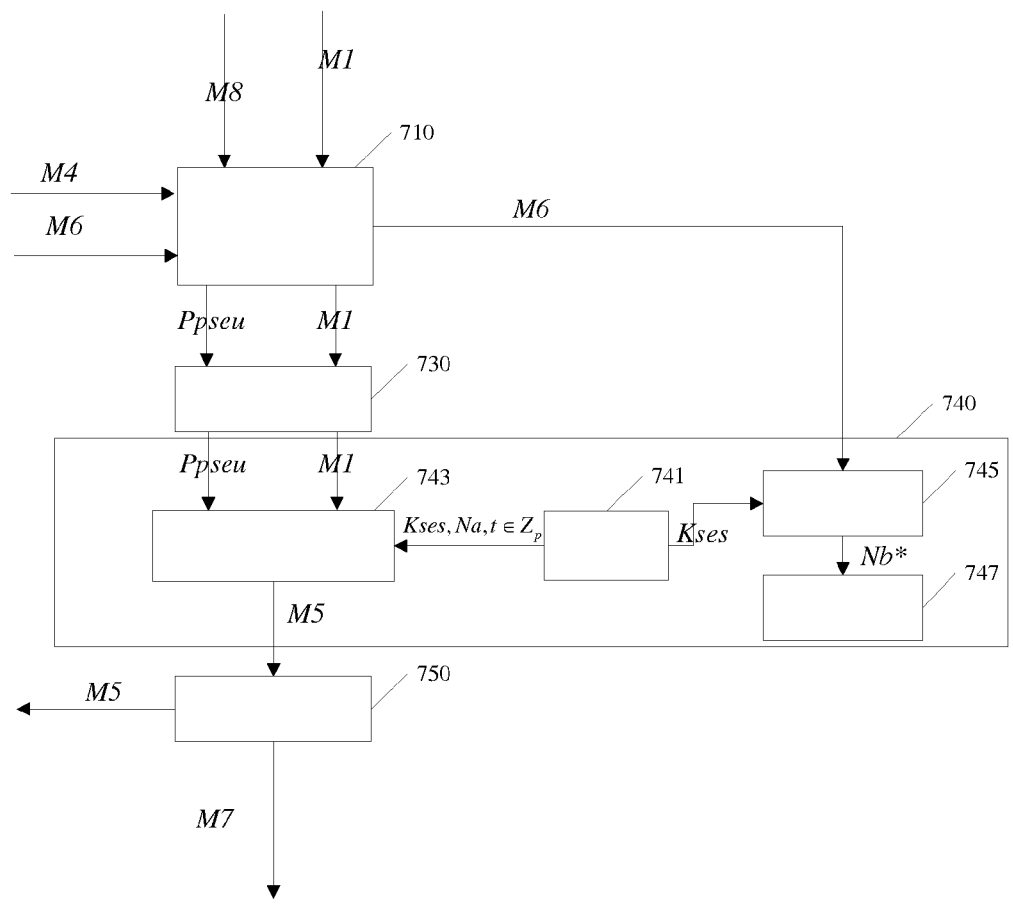
FIG. 7 illustrates the configuration of a third-party device according to an embodiment of the invention.

FIGS. 5-7 illustrate the block diagram of each of the three entities in FIG. 4. Those skilled in the art will appreciate that each unit in the block diagrams of FIGS. 5-7 may be combined with each other, or may be split into more according to its functions as desired. Therefore, the hardware structure as shown in FIGS. 5-7 is merely an example and is not limiting.

FIG. 5 illustrates the block diagram of the PIM D220. In FIG. 5, the PIM D210 comprises a receiving unit 510, a generating unit 520, a determining unit 530, a transmitting unit 540, a storage unit 550, a searching unit 560, and a calculating unit 570.

As shown in FIG. 5, the determining unit 530 may determine a set of public parameters {g, $g^{\partial}$, $G_1$, $G_2$, $\hat{e}$, $H_2$, p} and a set o to be used for pseudonym generation and authentication. The set of public parameters may be transmitted via the transmitting unit 540 to any other device, such as the user device D230 or a medical system D210 of a hospital within any region.

On the one hand, the receiving unit 510 shown in FIG. 5 receives $ID_{user}$ (message M2) from the user device D230. The received $ID_{user}$ is stored in the database of the storage unit 550 for query from the hospital. At the same time, the received $ID_{user}$ is fed into the generating unit 520. Based on the inputted $ID_{user}$ and the set o determined by the determining unit 530, the generating unit 520 may generate a prime pseudonym $P_{prime}=<H_1(ID_{user}),H_1^3(ID_{user})>$ corresponding to $ID_{user}$. The prime pseudonym $P_{prime}=<H_1(ID_{user}),H_1^3(ID_{user})>$ (message M3) generated by the generating unit 520 may be sent to the user device D230 via the transmitting unit 540.

On the other hand, the receiving unit 510 receives a sub-pseudonym $P_{pseu}$ (message M7) from the medical system D210 of the hospital. As shown in FIG. 5, the received sub-pseudonym $P_{pseu}$ is fed into the calculating unit 570 so as to calculate the query parameter $Ver=\hat{e}(g^3,Q_A)c_A$. The calculating unit 570 outputs the calculated query paranneter $Ver=\hat{e}(g^3,Q_A)c_A$ into the searching tint 560. Based on the inputted query parameter Ver, the searching unit 560 may search the database of the storage unit 550 for an $ID'_{user}$ so that $\forall ID_{user} \in DB:\hat{e}(Q_3,H^3))?=Ver$. If it can be found, the searching unit 560 may send the found $ID'_{user}$ to the medical system D210 via the transmitting unit 540 as the user identity corresponding to the sub-pseudonym $P_{pseu}$ (message M8).

FIG. 6 illustrates the block diagram of the user device D230 according to an embodiment of the invention. In FIG. 6, the user device D230 comprises a receiving unit 610, a storage unit 620, a generating unit 630 including a selecting unit 632 and a calculating unit 636, a transmitting unit 640, and an authenticating unit 650 including a session key acquisition unit 652, a decrypting unit 654, and an encrypting unit 656.

On the one hand, the transmitting unit 640 shown in FIG. 6 sends the real identity of the user $ID_{user}$ pre-stored in the storage unit 620 as a registration request (message M2) to the PIM D220. Then, the receiving unit 610 receives a registration response from the PIM D220, that is, the prime pseudonym $P_{prime}=<H_1(ID_{user}),H_1^3(ID_{user})>$ (message M3). At the same time, the receiving unit 610 also receives a set of public parameters $\{g, g^3, G_1, G_2, \hat{e}, H_2, p\}$ (message M1) from the PIM D220. The received set of public parameters and the prime pseudonym $P_{prime}=<H_1(ID_{user}),H_1^3(ID_{user})>$ are stored in the storage unit 620 for use in sub-pseudonym generation. In the generating unit 630, the selecting unit 632 selects two random numbers $k_1$ and $k_2$ based on the stored set of public parameters $\{g, g^3, G_1, G_2, \hat{e}, H_2, p\}$, $k_1, k_2 \in Z_p$, and sends them to the calculating unit 636. The calculating unit 636 itself may generate a sub-pseudonym $P_{pseu}=<Q_A, Q_B, c_A>$ based on $k_1$ and $k_2$, the set of public parameters and the prime pseudonym $P_{prime}$ stored in the storage unit. the generated sub-pseudonym $P_{pseu}=<Q_A, Q_B, c_A>$ and the identifier $ID_{server}$ of the PIM D220 (message M4) may be transmitted to the medical system D210 via the transmitting unit 640, for use in the hospital.

On the other hand, after the transmitting unit 640 sends the sub-pseudonym $P_{pseu}=<Q_A, Q_B, c_A>$ to the medical system D210, the medical system D210 may authenticate the validation of the sub-pseudonym. For example, the receiving unit 610 in FIG. 6 receives a query message $<g^t, K_{ses} \oplus H_2(O_B^t c_A^t), Enc(K_{ses}, N_a)>$ for authentication (message M5) from the medical system D210. The received query message is fed into the session key acquisition unit 652 in the authenticating unit 650. The session key acquisition unit 652 calculates a session key $K^*_{ses}$ based on the set of public parameters and the prime pseudonym stored in the storage unit 620 with the following equation:

$$K^*_{ses}=K_{ses} \oplus H_2(O_B^t c_A^t) \oplus H_2(\hat{e}(g^t,(H_1^3(ID_{user}))^{k12t})).$$

The calculated session key $K^*_{ses}$ is fed into the decrypting unit 654. The decrypting unit 654 decrypts the encrypted content $Enc(K_{ses}, N_a)$ in the query message with the calculated session key $K^*_{ses}$ so as to obtain a decrypted content $N_a^*$. The decrypted content $N_a^*$ is fed into the encrypting unit 656. The encrypting, unit 656 selects a response content $N_b$ corresponding to the decrypted content $N_a^*$ in accordance with a predetermined rule, and encrypts the response content $N_b$ with the calculated session key $K^*_{ses}$ so as to obtain a response message $Enc(K^*_{ses}, N_b)$. The response message $Enc(K^*_{ses}, N_b)$ (message M6) may be transmitted via the transmitting unit 640 to the medical s stem D210 for authentication. Here, the authenticating nun may be implemented in many other mariners, and is not limited to the configuration shown in FIG. 6.

FIG. 7 illustrates the configuration of the medical system D210 according to an embodiment of the invention. In FIG. 7, the medical system D210 comprises a receiving unit 710, a storage unit 730, an authenticating unit 740, and a transmitting unit 750. The authenticating unit 740 comprises a selecting unit 741, a query message generating unit 743, a decrypting unit 745, and a determining unit 747.

As shown in FIG. 7, the receiving unit 710 receive's a sub-pseudonym Ppseu and the identifier IDserver for identifying the PIM D220 with which the user registers. As shown in FIG. 7, the receiving unit 710 receives a sub-pseudonym Ppseu and the identifier IDserver for identifying the PIM D220 with which the user registers (message M4) from a user device. D230. An acquisition unit (not shown) obtains a set of public parameters $\{g, g^3, G_1, G_2, \hat{e}, H_2, p\}$ (message M1) published from the corresponding PIM D220 via the receiving unit 710 based on the received IDserver. The received Ppseu and the set of public parameters are stored in the storage unit 730 and sent to the authenticating unit 740 at the same time so that the validation of Ppseu may be authenticated in the authenticating unit 740. The authenticating unit of FIG. 7 may be implemented in many manners. FIG. 7 illustrates only one of these manners.

Specifically, the selecting unit 741 in the authenticating unit 740 selects a random number $t \in Z_p$, an original session key $K_{ses}$, and a query content $N_a$, for generating a query message. The original session key $K_{ses}$ is used to encrypt the query content $N_a$ so as to obtain an encrypted content $Enc(K_{ses}, N_a)$. Based on the selected parameter selected by the selecting unit 741, the sub-pseudonym, and the set of public parameters, the query message generating uint 743 generates a query message $<g^t, K_{ses} \oplus H_2(O_B^t c_A^t), Enc(K_{ses}, N_a)>$, and sends the query message (message M5) to the use device D230 via the transmitting unit 750. Then, after receiving the response message $Enc(K^*_{ses}, N_b)$ (Message M6) from the user device D230, the receiving unit 710 sends the response message to the authenticating unit 740. The decrypting unit 745 in the authenticating unit 740 decrypts the response message $Enc(K^*_{ses}, N_b)$ with the original session key $K_{ses}$. The determining unit 747 determines whether the predetermined rule is met between the decrypted response content $N_b^*$ and the query content $N_a$, and determines that the sub-pseudonym Ppseu is authenticated to he valid when the predetermined rule is met.

Specific embodiments of the invention have been described above with reference to FIGS. 1-7. In these embodiments, the user device may generate at least one sub-pseudonym securely based on a prime pseudonym from the PIM D220 whenever the hospital is visited. In the embodiments of the invention, the PIM D220 therefore has no need to generate pseudonyms frequently for the user, and the workload on the PIM is mitigated.

Moreover, in the embodiments described above, the medical system D210 of the hospital may authenticate the user-generated sub-pseudonym by interacting with the user device D230 on the basis of a set of public parameters obtained from the PIM D220. In this manner, the user-generated sub-pseudonym may be used in hospitals within different regions, and a cross-regional pseudonym service may thus be implemented.

Additionally, in the embodiments described above, the PIM D220 may find a corresponding user identity by traversing the $ID_{user}$ stored in the database for a corresponding user identity based on the sub-pseudonym provided by the medical system D210. In this manner, the PIM D220 has no need to store the prime pseudonym for each user, which further decreases the database requirements for the PIM D220 and thus decreases its cost.

Specific embodiments of the invention have been described above with reference to the accompanying drawings. It is to be noted that the above embodiments are intended to illustrate, rather than to limit the invention. It is to be understood by those skilled in the art that various improvements and modifications may be made to the apparatus and method of the invention without departing from the basis of the invention, the scope of which is to be defined by the attached claims. Moreover, any reference numeral in a claim shall not be construed as limiting the claim.

The invention claimed is:

1. A method for pseudonym generation in a Personal Identity Manager (PIM), the method comprising:
    with a computer hardware processor, determining a set of public parameters $\{g,g^\partial,G_1,G_2,\hat{e},H_2,p\}$ in which:
        $G_1$ and $G_2$ are two selected groups of order q modulo p, in which q is a prime number;
        $\hat{e}$ is a bilinear map and $\hat{e}:G_1 \times G_1 \rightarrow G_2$,
        g is a random generator selected from the group $G_1$,
        $H_2$ is a one-way hash function and $H_2:G_2 \rightarrow \{0,1\}^*$, and $H_1:\{0,1\}^* \rightarrow G_1$;
    with the computer hardware processor, receiving a user identity $ID_{user}$ from a user device;
    with the computer hardware processor, generating a prime pseudonym $P_{prime}=<H_1(ID_{user}),H_1^\partial(ID_{user})>$ based on the determined set of private parameters and the $ID_{user}$, in which $H_1$ is a one-way hash function, $\partial$ is a random number selected from a domain $Z_p$, and p is a selected prime number;
    with the computer hardware processor, transmitting the prime pseudonym $P_{prime}$ and the set of public parameters to the user device;
    with the computer hardware processor, receiving a sub-pseudonym $P_{pseu}=<Q_A,Q_B,c_A>$ from a third-party device;
    with the computer hardware processor, calculating a query parameter $Ver=\hat{e}(g^\partial,Q_A)c_A$ with the sub-pseudonym $P_{pseu}$ and the set of public parameters;
    with the computer hardware processor, searching for a user identity $ID'_{user}$ in stored user identities based on the query parameter $V_{er}$ such that $\hat{e}(Q_B,H^\partial(ID'_{user}))=Ver$;
    with the computer hardware processor, transmitting the $ID'_{user}$ to the third-party device as a user identity corresponding to the $P_{pseu}$.

2. The method as set forth in claim 1, further comprising the steps of:
    receiving an acquisition request from the third-party device; and
    transmitting the set of public parameters to the third-party device in response to the acquisition request.

3. The method as set forth in claim 1, further comprising with the computer hardware processor:
    receiving a sub-pseudonym $P_{pseu}$ from the user device; and
    authenticating a validation of the sub-pseudonym $P_{pseu}$ by interacting with the user device.

4. A method for pseudonym generation, the method comprising:
    with a computer hardware processor, receiving a user identity $ID_{user}$ and calculating a prime pseudonym $P_{prime}$ corresponding to the user ID with a computer hardware processor of a Personal Identity Manager (PIM) system;
    with the computer hardware processor, receiving a set of public parameters is $\{g,g^\partial,G_1,G_2,\hat{e},H_2,p\}$, from the PIM system in which:
        p is a prime number and $\partial$ is a random number selected from a domain $Z_p$;
        $G_1$ and $G_2$ are two groups of order q modulo p, in which q is a prime number;
        $\hat{e}$ is a bilinear map and $\hat{e}:G_1 \times G_1 \rightarrow G_2$;
        g is a random generator in the group $G_1$; and
        $H_2$ is a one-way hash function and $H_2:G_2 \rightarrow \{0,1\}^*$;
        and the prime pseudonym is $P_{prime}=<H_1(ID_{user}),H_1^\partial(ID_{user})>$,
        in which $H_1$ is a one-way hash function and $H_1:G_1 \rightarrow \{0,1\}^*$;
    with the computer hardware processor, generating a sub-pseudonym $P_{pseu}$ with the at least two random parameters, the set of public parameters, and the prime pseudonym $P_{prime}$ including:
        selecting two random numbers $k_1$ and $k_2$ from the domain $Z_p$ based on the set of public parameters; and
        with the selected random numbers $k_1$ and $k_2$, the set of public parameters and the prime pseudonym $P_{prime}$, calculating parameters:

$$Q_A = H_1^{k_1^2 k_2}(ID);$$

$$Q_B = g^{k_1^2};$$

$c_A = \hat{e}(Q_C,Q_D)$, in which $Q_C = g^{k_1 k_2}$, $Q_D = H_1^{\partial k_1(k_2^{-1}-1)}(ID)$, and $k_2 k_2^{-1}$ mod p=1; and
    with the computer hardware processor, generating a sub-pseudonym $P_{pseu}=<Q_A,Q_B,c_A>$ based on the calculated parameters.

5. The method as set forth in claim 4, further comprising with the computer hardware processor:
    transmitting the sub-pseudonym $P_{pseu}$ and an identifier $ID_{server}$ for identifying the PIM to a third-party device; and
    authenticating the sub-pseudonym $P_{pseu}$ by interacting with the third-party device as an authenticator.

6. The method as set forth in claim 5, wherein the step of authenticating comprises:
    authenticating a validation of the sub-pseudonym $P_{pseu}$ by exchanging zero-knowledge proofs with the authenticator.

7. The method as set forth in claim 6, wherein the step of exchanging zero-knowledge proofs with the authenticator comprises:
    receiving a query message from the authenticator, the query message being generated in accordance with the set of public parameters and the sub-pseudonym $P_{pseu}$, and being represented as $<g^t, K_{ses} \oplus H_2(O_B^t c_A^t), Enc(K_{ses},N_a)>$;
    in which t is a random number selected by the authenticator from $Z_p$;
    $O_B = \hat{e}(g^\partial, Q_A)$;
    $K_{ses}$ is an original session key selected by the authenticator;
    $N_a$ is a query content selected by the authenticator randomly; and
    $Enc(K_{ses},N_a)$ represents an encrypted content obtained by encrypting the query content $N_a$ with the original session key $K_{ses}$;

calculating a session key $K^*_{ses}$ with $K^*_{ses}=K_{ses}\oplus H_1(O_B^t c_A^t)\oplus H_1(\hat{e}(g^t,(H_2^{\partial}(ID_{user}))^{k_1^2 t}))$ based on the query message and the prime pseudonym $P_{prime}$;

decrypting the encrypted content $Enc(K_{ses},N_a)$ with the session key $K^*_{ses}$ so as to obtain a decrypted content $N_a^*$;

selecting a response content $N_b$ corresponding to the decrypted content $N_a^*$ in accordance with a predetermined rule, and encrypting the response content $N_b$ with the session key $K^*_{ses}$ so as to obtain a response message $Enc(K^*_{ses},N_b)$; and transmitting the response message $Enc(K^*_{ses},N_b)$ to the authenticator.

8. The method as set forth in claim 4, further comprising, with the computer hardware processor:

transmitting the sub-pseudonym $P_{pseu}$ to the PIM; and
authenticating the sub-pseudonym $P_{pseu}$ using the PIM system as an authenticator.

9. A method for pseudonym authentication in a third-party device, the method comprising the steps of:

with a computer hardware processor of the third-party device, receiving a sub-pseudonym $P_{pseu}$ and an identifier $ID_{server}$ for identifying a Personal Identity Manager (PIM) from a user device;

with the third-party device computer hardware processor, obtaining a set of public parameters $\{g,g^{\partial},G_1,G_2,\hat{e},H_2,p\}$ from the PIM system based on the identifier $ID_{server}$ in which;

p is a prime number and $\partial$ is a random number selected from a domain $Z_p$, $G_1$ and $G_2$ are two groups of order q modulo p, in which q is a prime number, $\hat{e}$ is a bilinear map and $\hat{e}:G_1 \times G_1 \to G_2$, g is a random generator in the group $G_1$, and $H_2$ is a one-way hash function and $H_2:G_2 \to \{0,1\}^*$; and with the third-party device computer hardware processor, authenticating a validation of the sub-pseudonym $P_{pseu}$ by exchanging zero-knowledge proofs with a computer hardware processor of the user device on the basis of the set of public parameters, exchanging the zero-knowledge proofs including:

selecting a random number t from a domain $Z_p$, selecting an original session key $K_{ses}$ and a query content $N_a$, and encrypting the query content $N_a$ with the original session key $K_{ses}$ to obtain an encrypted content $Enc(K_{ses},N_a)$, generating a query message $<g^t,K_{ses}\oplus H_2(O_B^t c_A^t),Enc(K_{ses},N_a)>$ with the random number t, the set of public parameters, the sub-pseudonym $P_{pseu}$, and the encrypted content $Enc(K_{ses},N_a)$, in which $O_B=\hat{e}(g^{\partial},Q_A)$;

transmitting the query message to the user device, receiving a response message $Enc(K^*_{ses},N_b)$ from the user device, in which $K^*_{ses}$ is a session key calculated with a computer hardware processor of the user device from the query message, and $N_b$ is a response content selected by the user device computer hardware processor in accordance with a predetermined rule based on a query content decrypted from $Enc(K_{ses},N_a)$, decrypting the response message with the original session key $K_{ses}$; and determining whether the predetermined rule is met between the decrypted response content $N_b^*$ and the query content $N_a$ so as to authenticate the validation of the sub-pseudonym $P_{pseu}$.

10. The method as set forth in claim 9, wherein:

the sub-pseudonym $P_{pseu}$ is transmitted to the PIM system; and a user identity $ID'_{user}$ is received from the PIM system as the user identity $ID_{user}$ corresponding to the sub-pseudonym $P_{pseu}$.

11. A Personal Identity Manager (PIM) system, comprising:

a PIM system computer hardware processor programmed to:

determine a set of public parameters $\{g,g^{\partial},G_1,G_2,\hat{e},H_2,p\}$ and a set of private parameters in which;

p is a prime number and $\partial$ is a random number selected from a domain $Z_p$, $G_1$ and $G_2$ are two groups of order q modulo p, in which q is a prime number, $\hat{e}$ is a bilinear map and $\hat{e}:G_1 \times G_1 \to G_2$, g is a random generator in the group $G_1$, and $H_2$ is a one-way hash function and $H_2:G_2 \to \{0,1\}^*$, receive a user identity $ID_{user}$ and a sub-pseudonym $P_{pseu}=<Q_A,Q_B,c_A>$ from a third-party device;

generate a prime pseudonym $P_{prime}=<H_1(ID_{user}),H_1^{\partial}(ID_{user})>$ based on the set of private parameters and the $ID_{user}$, in which $H_1$ is a one-way hash function, $\partial$ is a random number selected from a domain $Z_p$, and p is a selected prime number and $H_1:G_1 \to \{0,1\}^*$;

calculate a query parameter $Ver=\hat{e}(g^{\partial},Q_A)c_A$ with the sub-pseudonym $P_{pseu}$ and the set of public parameters; and search for a user identity $ID'_{user}$ in a storage unit storing the $ID_{user}$ based on the query parameter such that $\hat{e}(Q_B,H^{\partial}(ID'_{user}))=Ver$;

control a transmitter to transmit the prime pseudonym $P_{prime}$ to a user device and transmit the $ID'_{user}$ as a user identity corresponding to the sub-pseudonym $P_{pseu}$ to the third-party device.

12. A user device comprising:

a transmitting unit configured to transmit a user identity $ID_{user}$ to a Personal Identity Manager (PIM) system;

a receiving unit configured to receive a set of public parameters $\{g,g^{\partial},G_1,G_2,\hat{e},H_2,p\}$ and a prime pseudonym $P_{prime}$ corresponding to the $ID_{user}$ from the PIM system, wherein:

p is a prime number and $\partial$ is a random number selected from a domain $Z_p$, $G_1$ and $G_2$ are two groups of order q modulo p, in which q is a prime number, $\hat{e}$ is a bilinear map and $\hat{e}:G_1 \times G_1 \to G_2$, g is a random generator in the group $G_1$, $H_2$ is a one-way hash function and $H_2:G_2 \to \{0,1\}^*$, and the prime pseudonym $P_{prime}=<H_1(ID_{user}),H_1^{\partial}(ID_{user})>$, $H_1$ is a one-way hash function, and $H_1:G_1 \to \{0,1\}^*$; and a user computer hardware processor configured to:

select at least two random numbers $k_1$ and $k_2$, and calculate a sub-pseudonym $P_{pseu}$ with the selected random numbers $k_1$ and $k_2$, the public parameters, and the prime pseudonym $P_{prime}$, in which:

$Q_A=H_1^{k_1^2 k_2}(ID)$;

$Q_B=g^{k_1^2}$; and $c_A=\hat{e}(Q_C,Q_D)$, in which $Q_C=g^{k_1 k_2}$, $Q_D=H_1^{\partial k_1(k_2^{-1}-1)}(ID)$, and $k_2 k_2^{-1} \mod p = 1$.

13. The user device as set forth in claim 12, wherein:

the transmitting unit is further configured to transmit the sub-pseudonym $P_{pseu}$ and an identifier $ID_{server}$ for identifying the PIM system to a third-party device; and the user computer hardware processor is configured to authenticate the sub-pseudonym $P_{pseu}$ by interacting with the third-party device via the transmitting unit and the receiving unit.

14. The user device as set forth in claim 13, wherein the authenticating includes exchanging zero-knowledge proofs with the third-party device.

15. The user device as set forth in claim 14, wherein the authenticating by the user computer hardware processor includes:

receiving a query message from the third-party device via the receiving unit, the query message being generated by a third-party computer hardware processor in accordance with the set of public parameters and the sub-pseudonym $P_{pseu}$, and being represented as $<g^t, K_{ses} \oplus H_2(O_B{}^t c_A{}^t), Enc(K_{ses}, N_a)>$, in which t is a random number in the domain $Z_p$, that is, $t \in Z_p$;

$O_B = \hat{e}(g^\partial, Q_A)$;

$K_{ses}$ is an original session key selected by the third-party device;

$N_a$ is a query content selected by the third-party device randomly; and $Enc(K_{ses}, N_a)$ is an encrypted content obtained by encrypting the query content $N_a$ with the original session key $K_{ses}$; and calculating a session key $K^*_{ses}$ with an equation $K^*_{ses} = K_{ses} \oplus H_1(O_B{}^t c_A{}^t) \oplus H_1(\hat{e}(g^t, (H_2{}^\partial(ID_{user}))^{k_1{}^t}))$ based on the received query message;

decrypting the encrypted content $Enc(K_{ses}, N_a)$ with the session key $K^*_{ses}$ so as to obtain a decrypted content $N_a{}^*$; and selecting a response content $N_b$ corresponding to the decrypted content $N_a{}^*$ in accordance with a predetermined rule, and to encrypt the selected response content $N_b$ with the session key $K^*_{ses}$, so as to obtain a response message $Enc(K^*_{ses}, N_b)$;

and controlling the transmitting unit to transmit the response message $Enc(K^*_{ses}, N_b)$ to the third-party device.

16. A third-party device from which a user requests a service, the third-party device comprising:

a receiving unit configured to receive a sub-pseudonym $P_{pseu}$ and an identifier $ID_{server}$ for identifying a Personal Identity Manager (PIM) system from a user device;

a transmitting unit configured to transmit information to the user device;

a computer hardware processor configured to:

acquire a set of public parameters $\{g, g^\partial, G_1, G_2, \hat{e}, H_2, p\}$ from the PIM system based on the identifier $ID_{server}$ in which:

p is a prime number and $\partial$ is a random number selected from a domain $Z_p$, $G_1$ and $G_2$ are two groups of order q modulo p, in which q is a prime number, $\hat{e}$ is a bilinear map and $\hat{e}: G_1 \times G_1 \rightarrow G_2$, g is a random generator in the group $G_1$, and $H_2$ is a one-way hash function and $H_2: G_2 \rightarrow \{0,1\}^*$;

select a random number t from the domain $Z_p$, select an original session key $K_{ses}$ and a query content $N_a$, and encrypt the query content $N_a$ with the original session key $K_{ses}$ so as to obtain an encrypted content $Enc(K_{ses}, N_a)$;

generate a query message $<g^t, K_{ses} \oplus H_2(O_B{}^t c_A{}^t), ENC(K_{ses}, N_a)>$ with the random number t, the set of public parameters, the sub-pseudonym $P_{pseu}$, and the encrypted content $Enc(K_{ses}, N_a)$ in which $O_B = \hat{e}(g^\partial, Q_A)$, and to control the transmitting unit to transmit the query message to the user device;

decrypt a response message $Enc(K^*_{ses}, N_b)$ received from the user device via the receiving unit with the original session key $K_{ses}$, in which $K^*_{ses}$ is a session key calculated by the user device from the query message, and $N_b$ is a response content selected by the user device in accordance with a predetermined rule based on a query content decrypted from $Enc(K_{ses}, N_a)$; and determine whether the predetermined rule is met between the decrypted response content $N_b{}^*$ and the query content $N_a$, and to authenticate the sub-pseudonym $P_{pseu}$ to be valid when the predetermined rule is met.

17. The third-party device as set forth in claim 16, wherein:

the transmitting unit is further configured to transmit the sub-pseudonym $P_{pseu}$ to the PIM system; and the receiving unit is further configured to receive a user identity corresponding to the sub-pseudonym $P_{pseu}$ from the PIM system.

18. The third-party device as set forth in claim 16, wherein the third-party device is a medical system in a hospital.

* * * * *